US008850670B2

(12) United States Patent
Fiedler

(10) Patent No.: US 8,850,670 B2
(45) Date of Patent: Oct. 7, 2014

(54) CLOSURE DEVICE FOR CONNECTING TWO PARTS

(75) Inventor: Joachim Fiedler, Hannover (DE)

(73) Assignee: Fidlock GmbH, Hannover (DE)

( * ) Notice: Subject to any disclaimer, the term of this patent is extended or adjusted under 35 U.S.C. 154(b) by 613 days.

(21) Appl. No.: 13/144,559

(22) PCT Filed: Jan. 15, 2010

(86) PCT No.: PCT/EP2010/050462
§ 371 (c)(1), (2), (4) Date: Aug. 24, 2011

(87) PCT Pub. No.: WO2010/081880
PCT Pub. Date: Jul. 22, 2010

(65) Prior Publication Data

US 2011/0296653 A1 Dec. 8, 2011

(30) Foreign Application Priority Data

Jan. 15, 2009 (DE) ......................... 10 2009 005 087

(51) Int. Cl.

| | |
|---|---|
| ***F16B 21/00*** | (2006.01) |
| ***E05C 21/00*** | (2006.01) |
| ***E05C 5/00*** | (2006.01) |
| ***E05C 19/16*** | (2006.01) |
| ***E05C 19/06*** | (2006.01) |
| ***E05C 3/00*** | (2006.01) |
| ***A44B 11/25*** | (2006.01) |
| *A63C 11/22* | (2006.01) |

(52) U.S. Cl.

CPC ............... *A44B 11/2592* (2013.01); *E05C 5/00* (2013.01); *E05C 19/16* (2013.01); *A44D 2203/00* (2013.01); *E05C 19/06* (2013.01); *E05C 3/00* (2013.01); *A63C 11/222* (2013.01)

USPC ........................... 24/303; 292/251.5; 280/821

(58) Field of Classification Search

CPC .. F16B 21/00; A44B 11/2592; A63C 11/222; E05C 19/06; E05C 19/16; E05C 3/00; E05C 5/00; A44D 2203/00

USPC .................. 24/303; 292/251.5; 280/821, 822

See application file for complete search history.

(56) References Cited

U.S. PATENT DOCUMENTS

| | | | | |
|---|---|---|---|---|
| 5,367,891 A * | 11/1994 | Furuyama | 24/303 |
| 6,981,391 B2 * | 1/2006 | Suzuki | 24/303 |
| 2008/0047111 A1 * | 2/2008 | Garber | 24/303 |
| 2008/0272872 A1 * | 11/2008 | Fiedler | 335/295 |
| 2010/0283269 A1 | 11/2010 | Fiedler | |

FOREIGN PATENT DOCUMENTS

WO 2008-006357 A2 1/2008

* cited by examiner

*Primary Examiner* — Robert J Sandy

(74) *Attorney, Agent, or Firm* — The Webb Law Firm

(57) ABSTRACT

A closure device for connecting two parts includes a first connecting module and a second connecting module. The first connecting module can be arranged on the second connecting module in a closing direction and is mechanically latched with the second connecting module in a closed position. The device also includes magnetic means which cause a magnetic attraction force between the first connecting module and the second connecting module to support the transfer of the first connecting module into the closed position. The first connecting module can be released from the second connecting module by means of a movement of the first connecting module or a part of the first connecting module in an opening direction that differs from the closing direction. The magnetic means counteract a movement of the first connecting module in the opening direction.

15 Claims, 9 Drawing Sheets

CLOSURE DEVICE FOR CONNECTING TWO PARTS

CROSS-REFERENCE TO A RELATED APPLICATION

This application is a National Phase Patent Application of International Patent Application Number PCT/EP2010/050462, filed on Jan. 15, 2010, which claims priority of German Patent Application Number 10 2009 005 087.6, filed on Jan. 15, 2009.

BACKGROUND OF THE INVENTION

The invention relates to a closure device connecting two parts.

Such a closure device comprises a first connecting module and a second connecting module, which can be arranged in a closing direction on each other and are mechanically latched with each other in a closed position. Additionally, magnetic means are provided, which cause a magnetic attraction force between the connecting modules for supporting the transfer of the connecting modules in the closed position. The first connecting module can be released from the second connecting module by a movement of the first connecting module or part of the first connecting module in an opening direction, that differs from the closing direction, in order to open the closure device in this manner, wherein the magnetic means counteract a movement of the first connecting module in the opening direction.

In case of a closure device of this kind known from WO 2008/006357 A2 two connecting modules are applied on each other in a vertical closing direction and are mechanically latched by doing so. Due to the fact that a magnet is arranged on the first connecting module as well as on the second connecting module, respectively, or a magnet is arranged on one hand and a magnetic anchor on the other hand the establishing of a mechanical latching and thus the transfer of the disclosure device into the closing position is magnetically supported. If the magnet is suitably dimensioned, the closure of the closure device occurs almost automatically, when the connecting modules are approaching each other. When moving or distorting the first connecting module relative to the second connecting module, then the mechanical latching can also again be released, wherein simultaneously the magnetic means are sheared off from each other by a lateral movement and thus are removed from each other.

Closure devices of this kind provide on one hand in their closing position a safe and resilient connection of two parts to each other and can on the other hand be closed in a simple manner and can be again opened in a haptically comfortable manner. The fields of application of such closure devices extend to devices of general kind for (releasable) connecting two parts, as for instance closures of bags, lids or covers, connecting devices for belts or ropes or other components and such.

SUMMARY OF THE INVENTION

In case of the closure devices known from WO 2008/006357 A2 the connection of the first connecting module to the second connecting module is released, if a force acts in opening direction onto the first connecting module. There is a need for closure devices, which are also secured in case of an unintentional opening, if a load acts in the opening direction onto the first connecting module, and can thus absorb loads in any direction without that the closure device is released in an unintentional manner.

The object of the present invention is to provide a closure device which can be closed and opened in an easy and comfortable manner and is simultaneously secured against an unintentional opening by loads acting in any direction, which however provides optionally an emergency release when exceeding a predetermined load.

Thereby it is provided that the first connecting module and the second connecting module each comprise a guiding section being formed at least sectionally circular arc shaped for guiding the first connecting module on the second connecting module along the opening direction. The guiding sections of the first connecting module and the second connecting module are concentrically arranged to a pivot axis defined by a circular arc shaped guiding sections. Thereby a load application point or load application section being arranged on the first connecting module, at which a load applies to the first connecting module, has a distance from the pivot axis defined by the guiding sections, which is smaller than the distance of at least one part of a magnetic means from the pivot axis.

The guiding sections being formed at least sectionally circular arc shaped on the first connecting module and the second connecting module provide a guidance of the guiding modules to one another along a path of movement, which continuous according to the formation of the guiding sections circular arc shaped. In this manner the opening direction for releasing the connecting modules is provided: By moving the first connecting module along the circular arc shaped path of movement the first connecting module can be unlocked from the second connecting module by releasing the mechanical latching of the connecting modules by the displacement movement.

The guiding sections of the first connecting module and the second connecting module are arranged concentrically to each other. The first connecting module and the second connecting module are thereby not necessarily arranged about a (physical) pivot axis. The pivot axis can in fact be defined by the circular arc shaped guiding sections of the first connecting module and the second connecting module so that when displacing the first connecting module along the guiding sections relative to the second connecting module a circular arc shaped movement about the pivot axis is provided.

The guiding sections being formed at least sectionally circular arc shaped can basically comprise any large (or small) radius and can form in the limit case of a small radius also the pivot axis within the meaning of a physical (pivot) axis.

The load application point (centred in a point) or the load application section (extending spatially over a path distance), on which the load applies on the first connecting module, has a distance from the pivot axis defined by the guiding sections, which is smaller than the distance of at least a part of the magnetic means from the pivot axis. In other words at least a part of the magnetic means is located further away than the load application point or load application section.

The distance of the load application point or the load application section from the pivot axis determines, which loads can apply in the opening direction to the load application point or the load application section without that the closure device is opened. The background hereby is that due to the distance of the load application point or the load application section to the pivot axis a lever arm is provided, with which a loading force acts about the pivot axis on the first connecting module. If this lever arm is small then the closure device can also absorb large loads, wherein the loads can act in any direction, in particular also in the opening direction without that the closure device opens.

The magnetic means support on the one side the transfer of the first connecting module and the second connecting module into the closed position, the magnetic means hold on the other hand in the closed position also the first connecting module and the second connecting module in a position to each other so that during opening of the closure device by moving the first connecting module in the opening direction relative to the second connecting module a magnetic force of a magnetic means acting against this movement has to be overcome.

The distance of the load application point or load application section from the pivot axis is advantageously smaller than the distance of the pivot axis to an impact plane in the area of which the magnetic means are arranged and act between the first connecting module and the second connecting module for providing a force holding the first connecting module and the second connecting module in the closed position. The magnetic means can be thereby formed by a magnet each arranged on the first connecting module and the second connecting module or on the one hand by a magnet and on the other hand a magnetic anchor, wherein the impact plane is arranged spatially between these magnetic means. The magnetic means face each other and the impact plane (not necessarily being flat but also optionally being curved) continues between the magnetic means, for instance between the magnets facing each other, wherein in said impact plane the magnetic attraction forces act between the magnetic means.

The distance of the load application point or load application section from the pivot axis can also be smaller than the radius of at least one guiding section being formed at least sectionally circular arc shaped, wherein in the area thereof the magnetic means are arranged. The magnetic means act thereby in particular between an outer guiding section of the first connecting module and an assigned section of the second connecting module with a lever arm, which is larger than the lever arm of the load applying to the load application point or the load application section. In this case the guiding sections define the impact plane of the magnetic means. In order to open the closure device in case of a load acting in the opening direction (or a directional component of a loading force acting in the opening direction) it is then required that the moment caused by the load about the pivot axis is larger than the holding moment of the magnetic means. Since the lever arm of the load is smaller than the load of the lever arm of the magnetic means the loading force has to exceed the holding force of the magnetic means by a determined factor. The ratio of these forces can be adjusted by the ratio of the lever arms of the magnetic force and the loading force to each other (that means by the distances of the magnetic means on the one hand and the load application point or the load application section on the other hand from the pivot axis).

In a limit case the distance of the load application point or the load application section to the pivot axis is zero so that the load application point or the load application section is concentrically arranged to the pivot axis defined by the guiding sections. In this case also the lever arm is zero so that a load being applied does not cause a moment about the pivot axis and can thus not open the closure device. In case of such arrangement of the loading application point or the loading application section concentrically to the pivot axis any large loads, which act in any direction, can be absorbed by the closure device without that the closure device can open by the application of the load.

The first connecting module can be released from the second connecting module by movement relative to the second connecting module about the pivot axis defined by the guiding sections. The movement is thereby provided by the design of the guiding sections being formed at least sectionally circular arc shaped, wherein by displacing the first connecting module along the path of movement defined by the guiding sections about the pivot axis the closure device can be opened.

It is conceivable and of an advantage to provide two or more guiding sections being formed at least sectionally circular arc shaped each on the first connecting module and the second connecting module, wherein the guiding sections have different radii to the pivot axis and are each concentrically to each other. Due to the multiple pairs of guiding sections (to each guiding section with a determined radius on one connecting module a guiding section with the same or slightly deviating radius on the other connecting module is assigned) a pivot axis is defined, wherein a preferred storage and guidance of the parts on each other is provided by the pairs of guiding sections. A pair of guiding sections can thereby have a comparatively large radius, wherein in the area of these guiding sections also the magnetic means can be arranged in order to affect a force on these guiding sections holding the closure device in the closure position. A second pair of guiding sections can then have an essentially smaller radius in order to achieve a preferred storage of the connecting modules on each other with a smaller distance to the (virtual) pivot axis.

In order to open the closure device the first connecting module can comprise an actuating handle, via which the first connecting module can be actuated for moving relative to the second connecting module. An opening force can then be exerted on the first closing member via the actuating handle, which applies with a lever arm about the pivot axis to the first closing member, which is larger than the lever arm of the load applying to the load application point or load application section. The effective lever arm of the actuating handle can for instance match with the radius of the outermost guiding section of the first connecting module so that via the actuating handle an opening force can be introduced with a lever arm according to the radius of this outermost guiding section. In this context it is also conceivable that the lever arm of the actuating handle is much larger than the radius of the outermost guiding section so that a particular small opening force is required for opening the closure device.

It is achieved by defining the lever arms of the actuating handle on the one hand and an acting load on the other hand that on the one hand a low opening force is required for opening the closure device in the desired manner via the actuating handle, on the other hand however an undesired, unintentionally opening can only occur, if the loading force is large. In this manner an emergency release function of the closure device can be provided within the limits thereof the first connecting module is released from the second connecting module in case of a closing force acting on the load application point or load application section only, if this loading force exceeds in opening direction a predefined load limit. The load limit is thereby defined by the holding force affected by the magnetic means multiplied with the transmission ratio determined by the ratio of the lever arms. If the lever arm is small for the load then the load limit is accordingly large.

In this context the ratio of the predetermined load limit to an opening force required for opening the closure device is determined by the ratio of the lever arm of the opening force to the lever arm of the load applying to the load application point or load application section. If the ratio of the lever arms (lever arm of the opening arms to lever arm of the load) is large then only a low opening force is required for opening, while within the meaning of a emergency release the closure device releases only in case of a large loading force acting in the opening direction.

The mechanical latching of the first connecting module and the second connecting module in the closed position occurs advantageously via latching elements, which engage form fit with each other in the latched state. For this reason on the one hand a blocking piece and on the other hand a spring blocking element can be provided on the first connecting module and on the second connecting module, which are being brought into engagement with each other in a latching manner for establishing the closed position and encompasses each other in a form fitted manner in the closed position.

In a first embodiment of the mechanical latching it is provided that for releasing the first connecting module from the second connecting module the spring locking element and the blocking piece are moved towards each other by moving the first connecting module such that the spring locking element comes along the opening direction out of the area of the at least one blocking piece. Thus, the spring locking element and the blocking piece are displaced relatively to each other along the opening direction for opening so that the form fitted engagement (acting in a closing direction) is cancelled.

In a second embodiment the spring element and the blocking piece are displaced for releasing the first connecting module from the second connecting module from each other such that the spring locking element is pushed by running up onto a run up slope crosswise to the opening direction out of engagement with the blocking piece. By moving the first connecting module in the opening direction the spring locking element runs up onto the run up slope, is thus pushed in a direction crosswise to the opening direction and also crosswise to the closing direction out of engagement with the blocking piece and is released in this manner from the blocking piece so that the mechanical latching is cancelled.

When moving the first connecting module relative to the second connecting module the magnetic attraction force between the first connecting module and the second connecting module is simultaneously weakened, since the magnetic means, for instance a magnet each on the first and on the second connecting module or on one hand a magnet and on the other hand a magnetic anchor, are removed from each other by moving the connecting modules relative to each other along the path of movement defined by the guiding sections. In the opened state the mechanical latching is then disengaged and the magnetic means are removed from each other so that the first connecting module can be removed in a simple, easy manner from the second connecting module and the closure device can be opened.

The previously described closure device can be designed in a preferred manner for connecting a pole grip, in particular a ski pole grip, to a pole loop for holding the pole grip. The pole loop can for instance be tightly connected to a glove or can be integrally formed with such a glove, wherein a tight, resilient connection of the pole loop to the slope grip obtainable in a simple and haptically comfortable manner can be established, which can be released in an easy manner by actuating an actuating handle and provides simultaneously an emergency release function, so that in case of a large load the closure device is opened also without actuating the actuating handle and the connection is released.

A concrete embodiment of the closure device comprises two connecting modules between which a mechanical snap fastener exists, which closes in a closing direction (direction X) and opens in a opening direction (direction Y) after lateral movement of the connecting modules wherein during closing a blocking piece arranged on the one connecting module and a spring locking element with a hooking head arranged on the other connecting module push against each other during the closing in the closing direction (direction X) until the spring locking element deflects in a springly manner and subsequently snaps behind the blocking piece in a form fitted manner, during opening the connecting modules are moved crosswise (lateral) to the closing direction in the opening direction (direction Y) until the blocking piece and the spring locking element are disengaged, wherein said disengagement can occur by a lateral disengaging displacement without deflection of the spring locking element or by a deflection of the spring locking element by the means of an element deflecting a force during the lateral displacement of the connecting modules, a magnet is provided in the one connecting module and an anchor is provided in the other connecting module, which are arranged and dimensioned such that during closure the snap fastener is closed solely by the magnetic attraction between the one connecting module and the other connecting module in the closing direction (direction X) and during opening magnet and anchor are sheared off in the opening direction (direction Y) lateral via a predetermined path with a predetermined opening force, due to the circular arc shaped or axis like guiding sections the displacement of the connecting modules during opening in the opening direction (direction Y) is defined on a circular arc shaped movement about a pivot axis with a defined radius R, a load applies to a load application point on the one connecting module in a predetermined distance A from the pivot axis in any direction, wherein the distance, wherein $0 \leq A < R$ is, so that the load, which can be maximally applied, which acts in any direction on the load application point, is always larger than the opening force required for opening and the closure can be opened with a smaller force than the maximum loading force, wherein the ratio between opening force and maximum loading force is determined by the ratio of A to R.

Several advantages are thereby provided.

If it is required according to the embodiment that the closure device cannot be opened if possible by any however large load acting in any direction, then the load application point will be positioned directly in the central point (according to the pivot axis) of the circular arc shaped guidance between the connecting modules, that means A=0. Then also a load acting in opening direction cannot cause a movement of the first connecting module and the closure device cannot unintentionally be opened.

It is required according to the embodiment that the closure according to the invention comprises an emergency release function, that means that the closure opens automatically in case of a predefined load acting in opening direction, the distance between the load application point and the pivot axis will be chosen such that the ratio of the distances (A/R) corresponds to the desired reduction between opening force and maximal load. An emergency release function of the closure device exists then, if a predefined load acts in the opening direction.

BRIEF DESCRIPTION OF THE DRAWINGS

The idea of the invention shall be explained in the following in more detail by means of the embodiments illustrated in the figures. It shows.

DETAILED DESCRIPTION OF THE INVENTION

Figure 2:
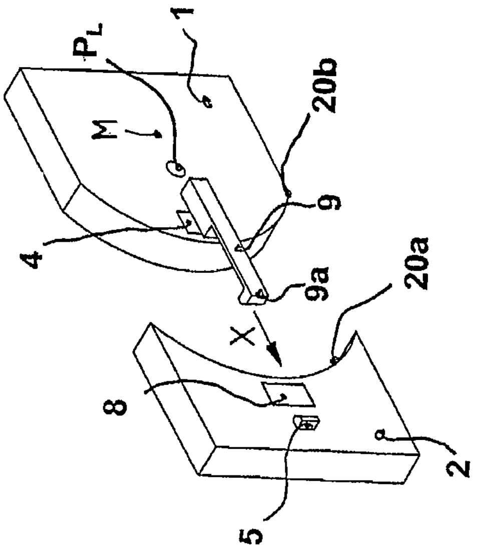
FIG. 2 a perspective view of the closure device in the opened state.

In a first embodiment of a closure device 100 illustrated in FIGS. 1 to 4 a first connecting module 1 is mechanically latched with a second connecting module 2 in a closed position (FIG. 1) via a spring locking element 9 and a blocking piece 5. In order to establish the mechanical latching the first connecting module 1, as illustrated in FIG. 2, is applied to the second connecting module 2 in a closing direction X so that the spring locking element 9 arranged on the first connecting module 1 engages in a latching manner with a hook 9*a* with the blocking piece 5 arranged on the second connecting module 2 and encompasses said blocking piece in a form fit manner. In the closed position according to FIG. 1 the first connecting module 1 and the second connecting module 2 are then connected to each other in a form fitted manner.

A magnet 4, 8 (or on the one hand a magnet and on the other hand a magnetic anchor of a ferromagnetic material, for instance a steal) are arranged on the first connecting module 1 and on the second connecting module 2, respectively. These magnetic means cause a magnetic attraction force between the first connecting module 1 and the second connecting module 2, which support the transfer into the closed position by providing a magnetic attraction force by a suitable polarity and alignment of the magnets 4, 8 to each other.

The magnetic means 4, 8 can be thereby dimensioned and designed such that the transfer into the closed position occurs almost automatically, if the first connecting module 1 approaches the second connecting module 2.

The first connecting module 1 is moved relatively to the second connecting module 2 for opening the closure device 100 so that the spring locking element 9 with the hooks 9*a* arranged thereon disengages laterally with the blocking pin 5. For this reason a guiding section 20*a*, 20*b* is formed in each case on the first connecting module 1 and the second connecting module 2, wherein said guiding sections provide a sliding guidance of the connecting modules 1, 2 to one another and define a circular arc shaped path of movement about a virtual pivot axis M of the first connecting module 1 relative to the second connecting module 2. Due to the circular arc shaped movement in an opening direction Y, as illustrated in FIG. 4A, the spring locking element 9 can be brought accordingly into disengagement with the blocking piece 5 so that the closure device 100 can be opened and the first connecting module 1 can be released from the second connecting module 2.

The guiding sections 20*a*, 20*b* define a (curved) impact plane, wherein the magnetic means 4, 8 are arranged on both sides thereof and in which the magnetic means 4, 8 act according to the (force) centre of gravity.

Figure 4A:
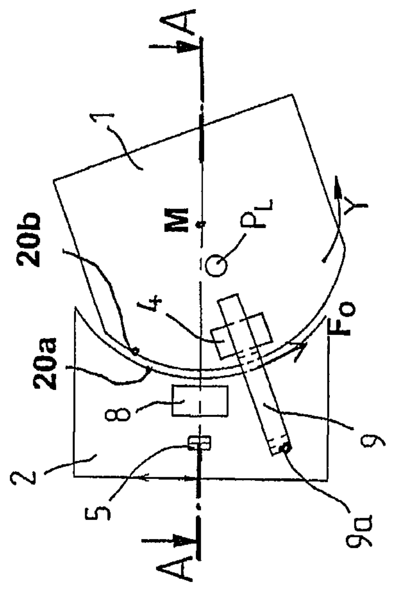
FIG. 4A a top view of the closure device in an open state.
Figure 4B:
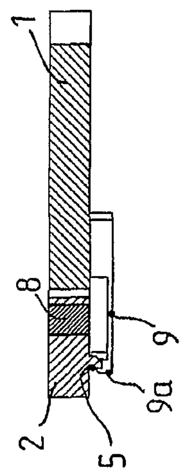
FIG. 4B a cross sectional view of the closure device in an opened state along the line A-A according to FIG. 4A.

As apparent from FIG. 4A, when moving the first connecting module 1 in the opening direction Y the magnetic means 4, 8 are simultaneously removed from each other by lateral shearing off each other by a tangential movement of the first connecting module 1 relative to the second connecting module 2 along the guiding sections 20*a*, 20*b* and thus the magnetic attraction force of the magnetic means 4, 8 is weakened. This allows for an easy, haptically comfortable release of the first connecting module 1 from the second connecting module 2 in the unlocked state of the closure device 100 (FIG. 4A).

Figure 3A:
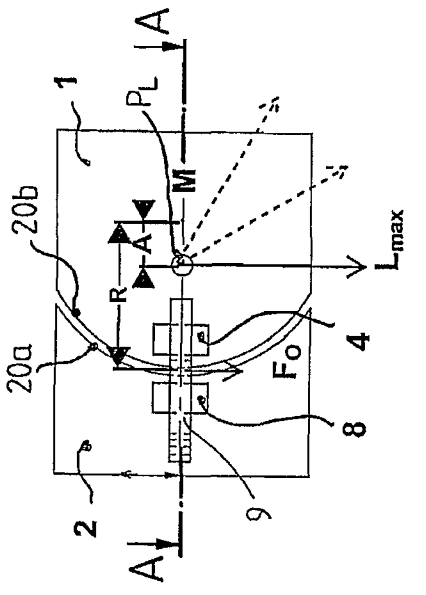
FIG. 3A a top view of the closure device.
Figure 3B:
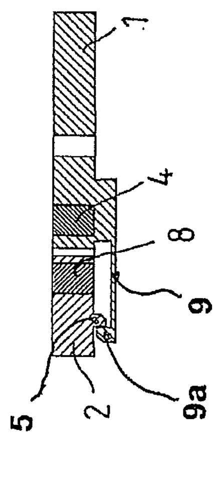
FIG. 3B a cross sectional view of the closure device along the line A-A according to FIG. 3A.
Figure 6:
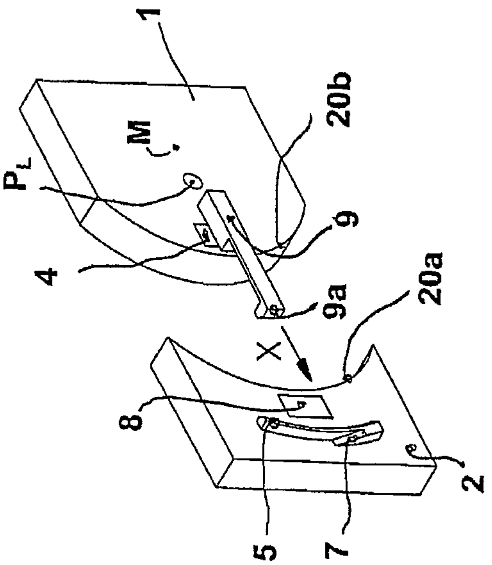
FIG. 6 a perspective view of the closure device according to FIG. 5 in an opened state.
Figure 5:
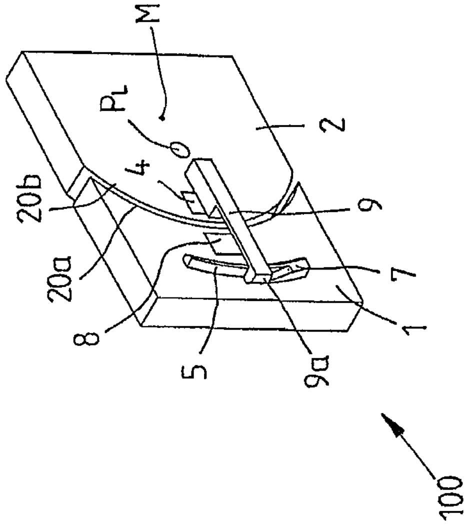
FIG. 5 a perspective view of a second embodiment of a closure device in the closed position.

The opening of the closure device 100 can occur for instance by actuating a suitable actuating handle, which is arranged on the first connecting module 1. The opening occurs by applying an opening force F0, which as illustrated in FIGS. 3A and 4A applies to the first connecting module 1 with a lever arm according to the radius R of the guiding section 20*b* of the first connecting module 1 about the pivot axis M and overcomes the magnetic holding force of the magnetic means 4, 8. The moment about the pivot axis M is exerted to the first connecting module 1 by the opening force F0. Due to the relatively large lever arm (radius R) about the pivot axis M a comparatively low opening force F0 is required for opening the closure device 100.

A load application point PL is arranged on the first connecting module 1, on which a load applies to the first connecting module 1. In case of the illustrated closure device 100 a loading occurs thus concentrated in a point, namely the load application point PL. This load application point PL is arranged with a distance A to the pivot axis M (FIG. 3A), wherein this distance A is smaller than the radius R of the guiding section 20*b* so that the lever arm of a load applying to the load application point PL is small in comparison to the lever arm of the opening force F0 (see FIG. 3A).

The illustrated closure device 100 provides thus a device, which can be opened by applying a comparatively small opening force F0, which can however simultaneously withstand a comparatively large loading force Lmax acting directly in the opening direction without that the closure device 100 is opened. The ratio of the opening force F0 to the maximum loading force Lmax is thereby determined by the ratio of the lever arms A to R.

Figure 1:
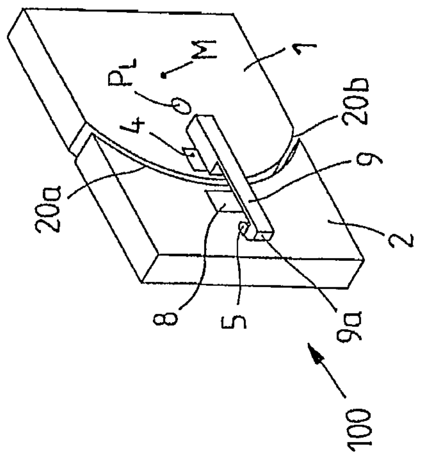
FIG. 1 a perspective view of a first embodiment of a closure device in the closed position.

The size of the maximal absorbable loading force Lmax is determined by the attracting force of the magnetic means 4, 8, which holds the connecting module 1 along the opening direction Y relative the second connecting module 2 in the closed position (FIG. 1, FIG. 3A). In order to open the closure device 100 by a load applying to the load application point PL it is necessary that the loading component acting in the opening direction Y is larger by the transmission ratio defined by the ratio of the lever arms R to A than the holding force of the magnetic means 4, 8.

If the distance A of the load application point PL to the pivot axis M is reduced to zero, thus the load application point PL is arranged concentrically to the pivot axis M, the lever arm of an acting loading force is zero so that the any large loading force acting in any direction cannot open the closure device 100, since this loading force is not suitable to cause a moment about the pivot axis M.

If the distance A of the load application point PL does not equal zero, that means if the load application point PL is distanced from the pivot axis M, then an emergency release function is provided, which causes an opening of the closure device 100, if the loading force acting on the load application point PL in the opening direction Y exceeds the maximal loading force Lmax, corresponding to a preset load limit. The size of this load limit is thereby determined by the lever arms R, A and the size of the magnetic attraction force of the magnetic means 4, 8 is determined in the closed position and can be dimensioned in a desired manner for an emergency release by selecting the magnets 4, 8 and the lever arms R, A.

The opening Force F0 (and accordingly the maximal loading force Lmax) can also be influenced by the design of the magnets 4, 8. If for instance the opening force F0 is small, then the length of the magnets 4, 8 or of magnet and anchor is large so that the magnetic attraction is sheared off over a longer path. The required opening force F0 is enlarged, if the attraction force between the magnets 4, 8 (or between anchor and magnet) is stronger.

A mechanical latching in opening direction can also be provided additionally, for instance by a latching nose engaging in a recess, which has to be overcome for opening.

In further embodiments multiple magnet poles can also be arranged in the connecting modules 1, 2. The opening force required for opening can thus be dimensioned in a larger manner (by the same magnet mass) in its value by a suitable arrangement of the poles.

Furthermore, the load application point PL can be at a free selectable point on the first connecting module 1, thus in the view according to FIG. 3A also right from the central point, as long the distance is $0<A<R$. The load application point PL can also be arranged outside of a line through the pivot axis M and the spring locking element 9. In this manner an emergency release can be allowed in a simple manner by a force acting in a defined direction (for instance against the closing direction X).

It can also be provided that the load does not apply concentrically to a load application point PL, but for instance via a load application section in form of a long hole like, optionally also curved recess.

A second embodiment of a closure device 100 is illustrated in FIGS. 5 to 8. Components of the same function, if suitable, are thereby provided with the same reference sign in the figures and also in the description.

The closure device 100 according to FIGS. 5 to 8 is essentially identical in its function to the closure device previously described by the means of FIGS. 1 to 4. Thus, a first connecting module 1 can be applied to a second connecting module 2 in a closing direction X in order to mechanically latch the connecting modules 1, 2 to each other. A mechanical latching can be released by a circular arc shaped movement in an opening direction Y, which differs from the closing direction X, as illustrated in FIG. 8A.

The essential difference of the closure device 100 according to FIGS. 5 to 8 to the closure device according to FIGS. 1 to 4 is the design of the blocking piece 5, which comprises in case of this closure device 100 a run up slope 7 for unlocking the mechanical latching. In contrast to the embodiment according to FIGS. 1 to 4 the spring locking element 9 of the connecting module 1 is not displaced laterally into disengagement with the blocking piece 5 by moving the first connecting module 1 in the opening direction Y along the guiding sections 20*a*, 20*b* in case of the closure device 100 according to FIGS. 5 to 8, but rather the hook 9*a* of the spring locking element 9 runs up to the run up slope 7 and is pushed into disengagement with the blocking piece 5 vertical to the plane defined by the closing direction X and the opening direction Y.

Figure 8A:
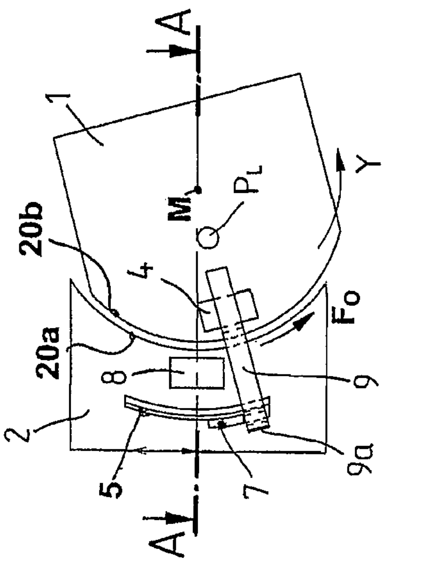
FIG. 8A a top view of the closure device in an opened state.
Figure 8B:
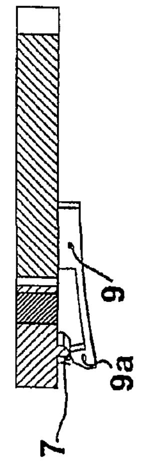
FIG. 8B a cross sectional view of the closure device in an opened state along the line A-A according to FIG. 8A.
Figure 7A:
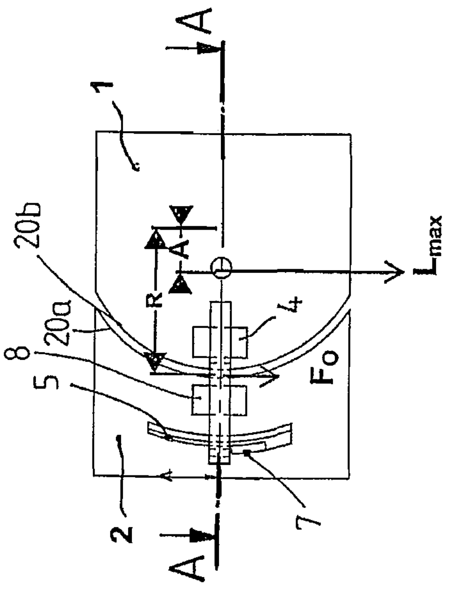
FIG. 7A a top view of the closure device in the closed position.
Figure 7B:
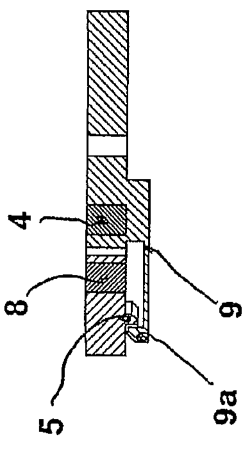
FIG. 7B a cross sectional view of the closure device along the line A-A according to FIG. 7A.

In the open state illustrated in the cross sectional view according to FIG. 8B, the form fitted engagement of the hook 9*a* with the blocking piece 5 is cancelled so that the first connecting module 1 can be released from the second connecting module 2.

The action in case of the applying loading forces and for opening the closure device 100 is otherwise identical to the embodiment described previously by the means of FIGS. 1 to 4.

FIGS. 9 to 13 show an embodiment of a closure device 100, which serves for connecting a ski pole grip 10 of a ski pole to a pole loop 12 and the hold-up aid for a user. The closure device 100 serves thereby to provide on the one hand a connection of the ski pole loop 12 to the ski pole grip 10, which can be closed and opened via an actuating handle 11 in a tight, haptically comfortable manner, which can be loaded in any direction, but provides simultaneously an emergency release function within which the closure device 100 opens automatically when exceeding a predefined load limit.

Figure 9D:
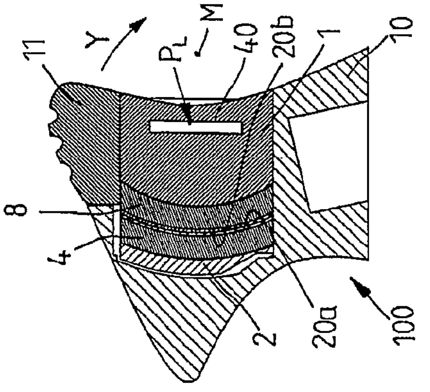
FIG. 9D a cross sectional view of the ski pole grip along the line A-A according to FIG. 9C.
Figure 9C:
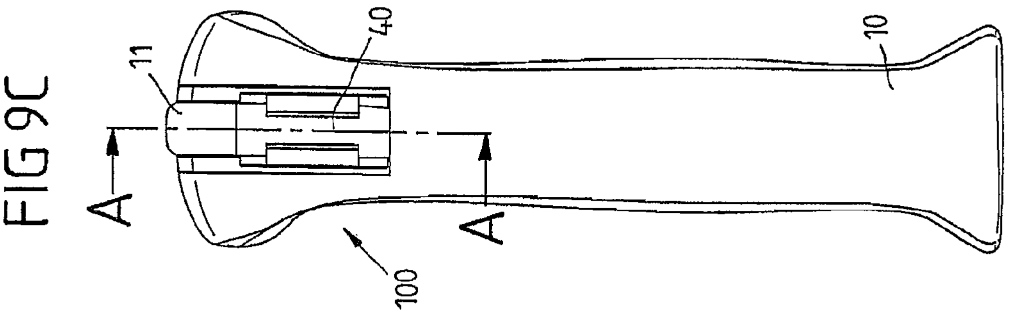
FIG. 9C a view from behind of the ski pole grip according to FIG. 9A.
Figure 11:
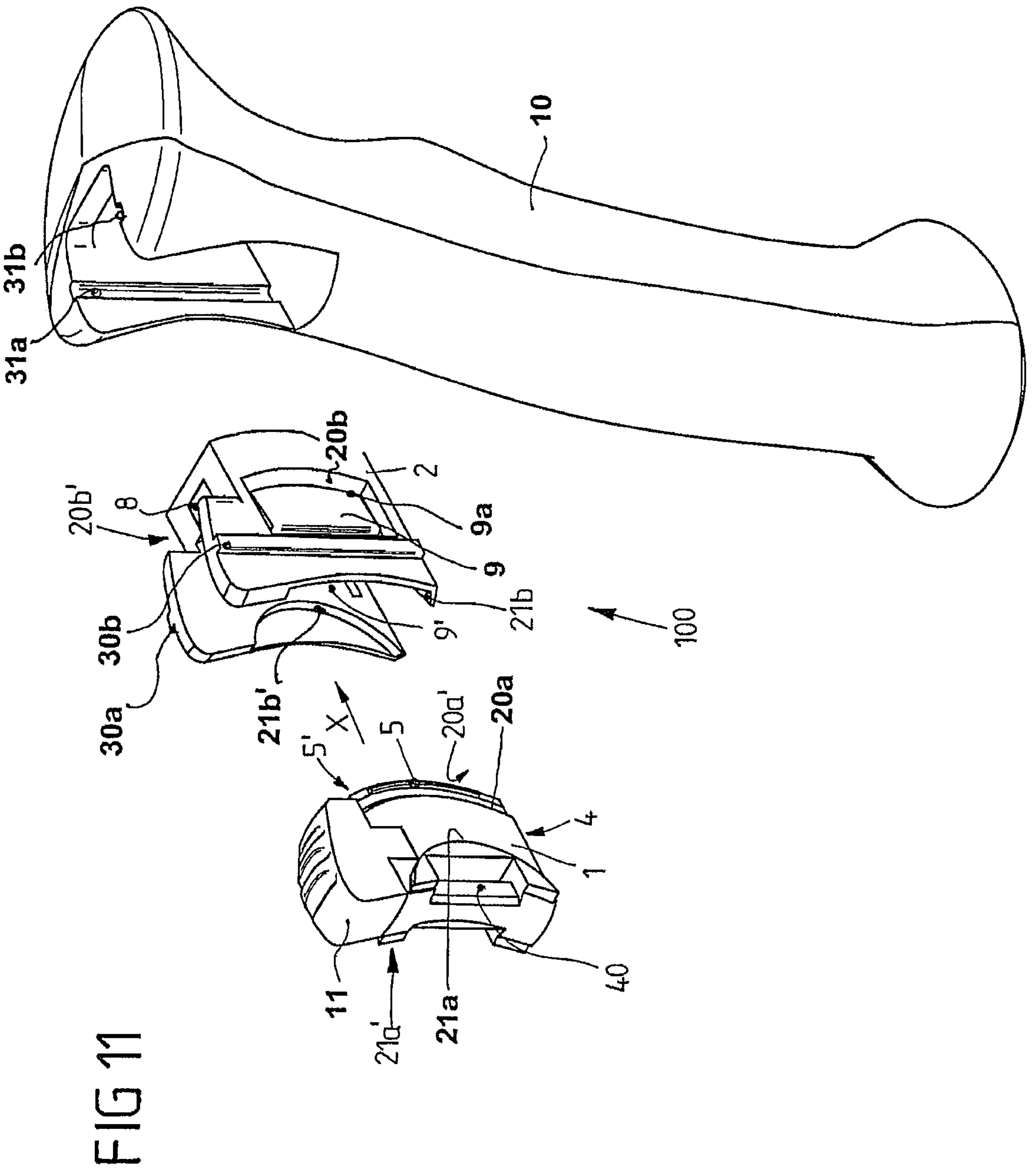
FIG. 11 an explosive view of the closure device and the ski pole grip.

As illustrated in the cross sectional view according to FIG. 9D and apparent from the exploded view according to FIG. 11 the closure device 100 comprises a first connecting module 1 and a second connecting module 2, of which the second connecting module 2 is tightly connected to the ski pole grip 10 via bars 30*a* and 30*b* engaging in a form fit manner with recesses 31*a*, 31*b* of the ski pole grip 11.

As apparent from FIG. 11 spring locking elements 9, 9' are arranged on the second connecting module 2, which engage with blocking pieces 5, 5' protruding hook like outwards on the first connecting module 1 using hooks 9*a* protruding inwards (see also FIG. 10D), in order to connect the first connecting module 1 in the closed position of a closure device 100 form fitted to the second connecting module 2. The spring locking elements 9 are thereby formed crosswise to the closing direction X and also crosswise to the opening direction Y outwards in a springy manner so that by applying the first connecting module 1 in the closing direction X to the second connecting module 2 the spring locking elements 9 engage latchingly and form fitted with the blocking pieces 5, 5' of the first connecting module 1 and establish a mechanical latching.

Figure 12A:
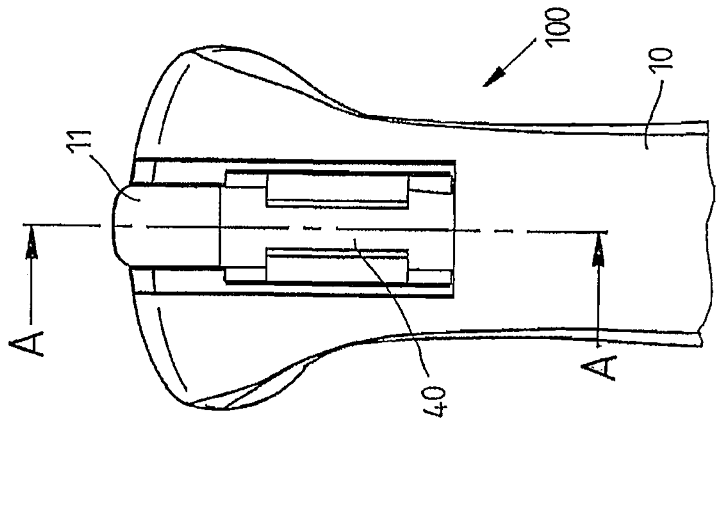
FIG. 12A a view from behind of the ski pole grip with a closure device arranged thereon.
Figure 12B:
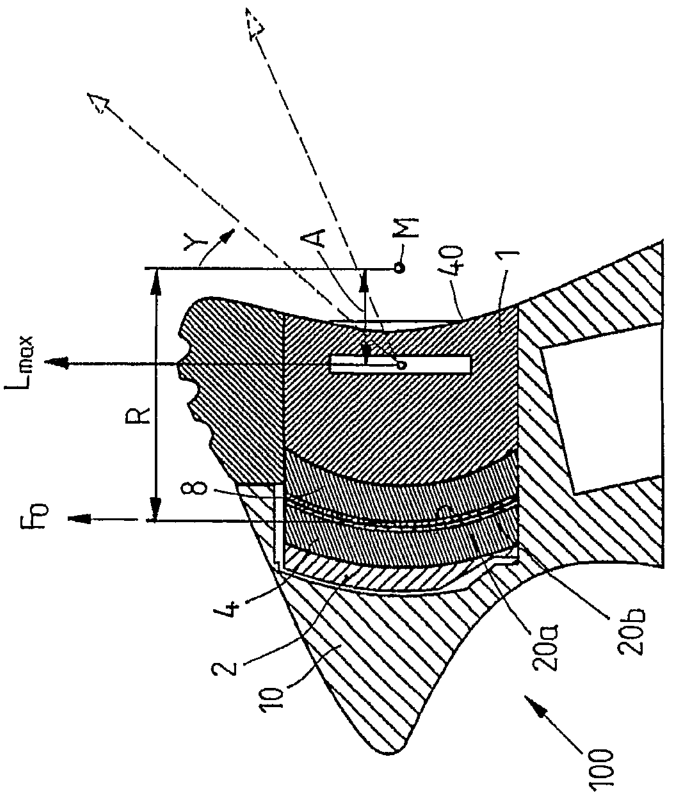
FIG. 12B a cross sectional view along the line A-A according to FIG. 12A.
Figure 13B:
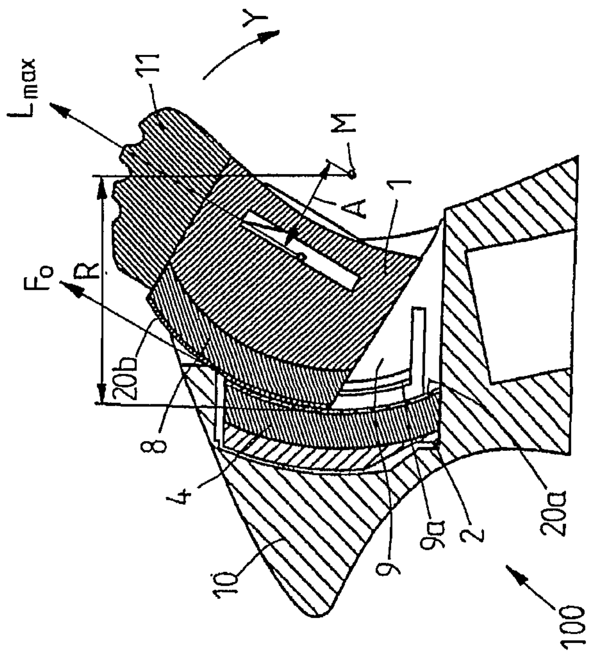
FIG. 13A a view from behind of the ski pole grip with the closure device in an opened state and FIG. 13B a cross sectional view of the ski pole grip along the line A-A according to FIG. 13A.
Figure 13A:
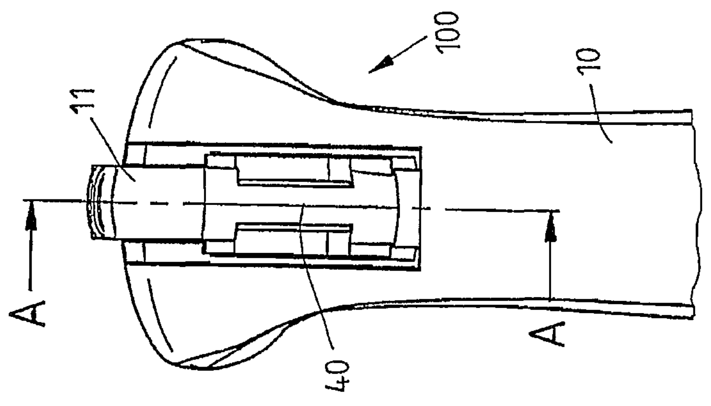

The closed position is illustrated in enlarged views in FIGS. 9A to 9D and in FIGS. 12A to 12B.

Figure 9B:
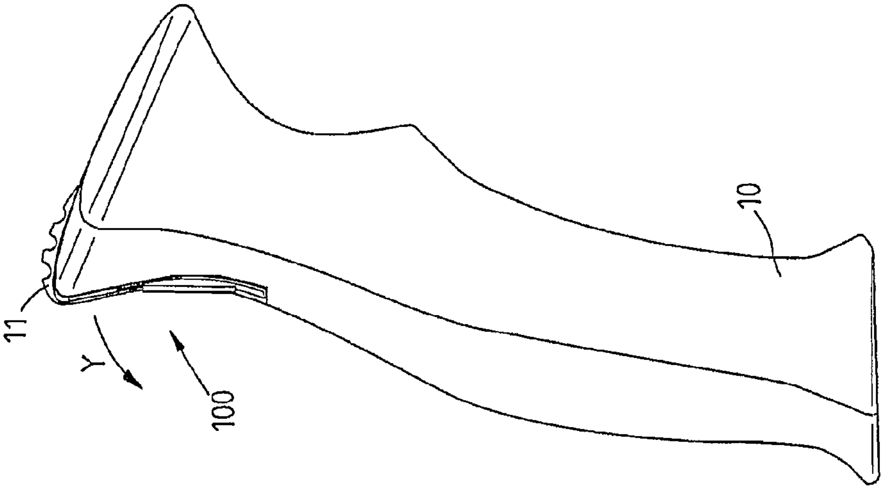
FIG. 9B a side view of the ski pole grip according to FIG. 9A.
Figure 9A:
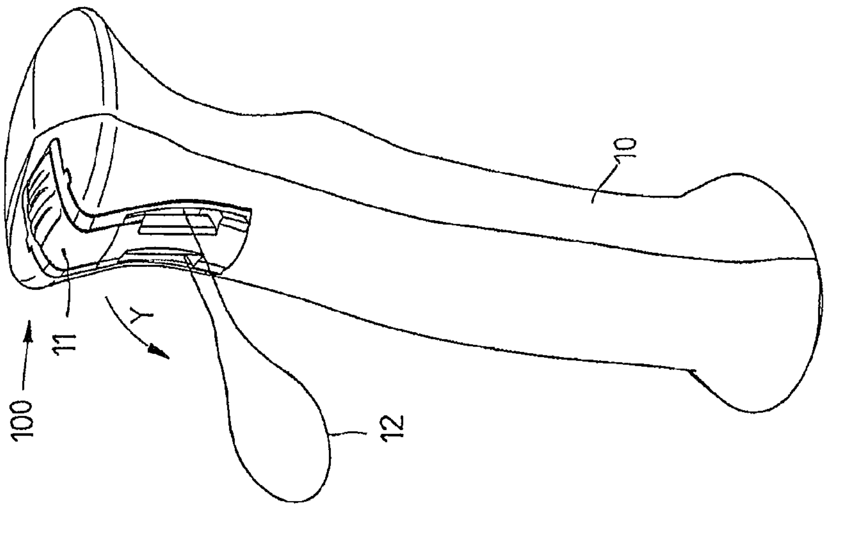
FIG. 9A a perspective view of a ski pole grip with a closure device for tethering a pole loop.
Figure 10D:
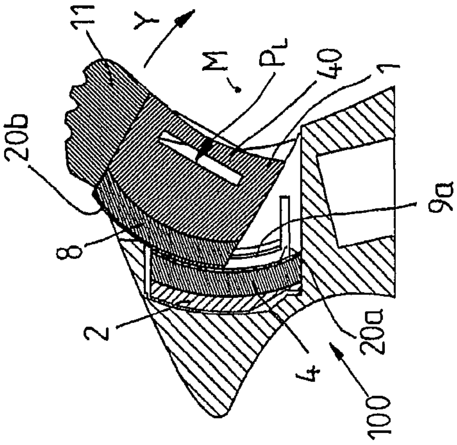
FIG. 10D a cross sectional view of the ski pole grip along the line A-A according to FIG. 10C.
Figure 10C:
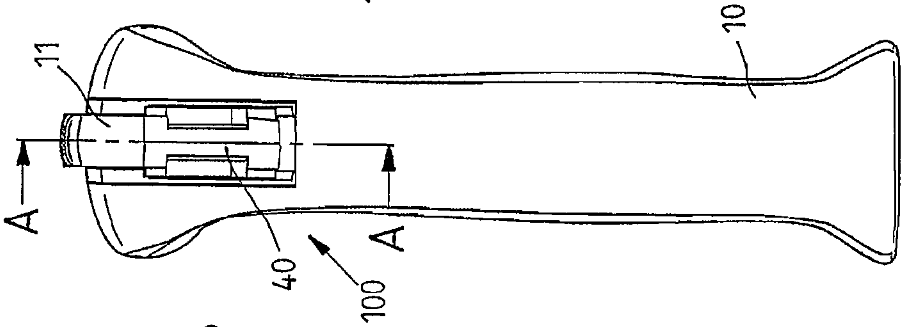
FIG. 10C a view from behind of a ski pole grip with the closure device in an opened state.
Figure 10B:
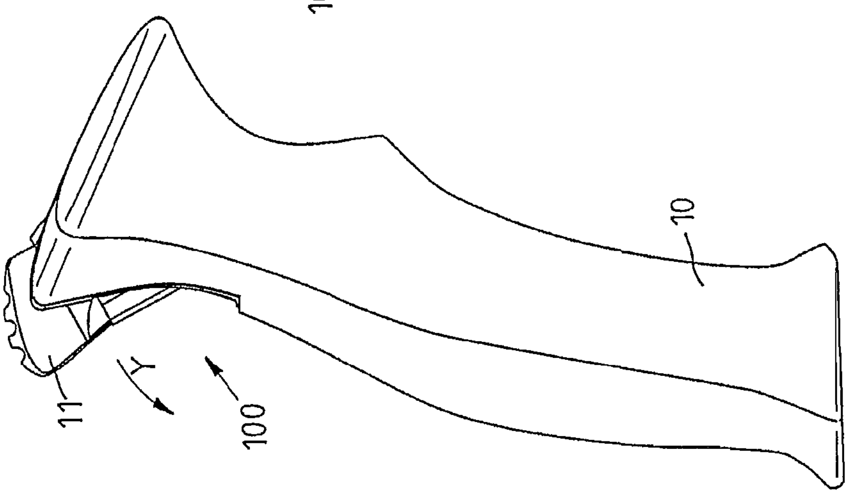
FIG. 10B a side view of the ski pole grip with the closure device in an opened state.
Figure 10A:
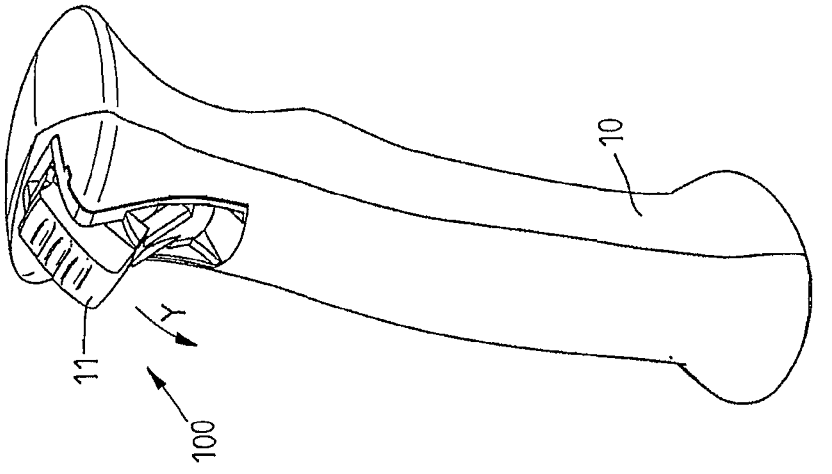
FIG. 10A a perspective view of the ski pole grip with the closure device in an opened state.

Two pairs of guiding sections 20*a*, 20*a*' and 21*a*, 21*a*' are formed on the first connecting module 1, to which pairs of guiding sections 20*b*, 20*b*', 21*b*, 21*b*' on the second connecting module 2 are assigned (see also FIG. 9B). The guiding sections 20*a*, 20*a*', 21*a*, 21*a*', 20*b*, 20*b*', 21*b*, 21*b*' are in each case formed circular arc shaped and define a circular arc shaped support of the first connecting module 1 on the second connecting module 2. The guiding sections 20*a*, 20*a*', 21*a*, 21*a*', 20*b*, 20*b*', 21*b*, 21*b*' define thereby a circular arc shaped path of movement along which the first connecting module 1 can be moved in the opening direction Y relative to the second connecting module 2.

The actuating handle 11 is formed on the first connecting module 1 for actuating in the opening direction Y, when said actuating handle can be actuated by a user in the opening direction Y for pivoting about a pivot axis M (which is defined by the concentrical guiding sections 20*a*, 20*a*', 21*a*, 21*a*', 20*b*, 20*b*', 21*b*, 21*b*') in order to move the first connecting module 1 relative to the second connecting module 2 and thus to disengage the spring locking elements 9, 9' from the blocking pieces 5, 5' for opening the closure device 100 (see FIGS. 10A to 10D).

Magnetic means 4, 8 each in form of a magnet or on the one hand a magnet and on the other hand a magnetic anchor are provided on the first connecting module 1 and the second connecting module 2, which cause a magnetic connection force between the first connecting module 1 and the second connecting module 2 and support the transfer of the first connecting module 1 into the closed position.

A mounting bar 40 is formed on the first connecting module 1, which provides a load application section PL for mounting the pole loop 12 to the first connecting module 1. Thus, the loading force acts via the mounting bar 40 onto the first connecting module 1, wherein said force is absorbed by the mechanical latching of the first connecting module 1 to the second connecting module 2 in the closed position and the attracting force of the magnetic means 4, 8.

The closure device 100 is thereby formed such that a loading force can be absorbed in any direction, whereby however an emergency release function is provided, if the loading force exceeds in the opening direction Y a predefined load limit.

In analogy to the embodiments according to FIGS. 1 to 4 and according to FIGS. 5 to 8 the mounting bar 40 presenting a load application section is arranged with a distance to the pivot axis M. If a loading force applying thereto exceeds in the opening direction Y a load limit, which is determined by the attracting force of the magnetic means 4, 8 acting in the opening direction Y and the ratio of the lever arms of the holding magnetic force and the load applying thereto, then the closure device 100 opens under loading.

When arranging the mounting bar 40 (and thus when determining the lever arm for the loading) and furthermore by dimensioning the holding force of the magnetic means 4, 8 in the opening direction Y this load limit can be defined and can be adjusted to a desired value defined by the means of safety aspects.

The closure device 100 can absorb loading forces in any direction as long as the value thereof is below the load limit. If the component of the loading exceeds in the opening direction Y the load limit then the closure device 100 opens automatically by the means of an emergency release function.

Since the actuating handle 11 is on a large radius in comparison to the mounting bar 40, the force required for opening is essentially lower than the load limit when actuating the actuating handle 11. This allows for an easy, haptically comfortable opening of the closure device 100 by actuating the actuating handle 11.

In the present embodiment the ratio of the radius R of the outer circular arc shaped guiding sections 20*a*, 20*a*', 21*a*, 21*a*', 20*b*, 20*b*' to the distance of the mounting bar 40 is about 3:1 (see FIG. 12B). The load acting in any direction that means in the most unfavoured case also in opening direction F0, can thus be about three times as large as the opening force F0. This ratio was selected in the embodiment in order to provide for instance an emergency release function in a suitable manner in case of an overturn of a ski driver.

The magnetic means 4, 8 (magnets or anchor and magnet) are selected in the illustrated embodiment comparatively long, that means they are slowly sheared off from each other during opening via a long displacement path so that the required opening force F0 for opening is small.

Since the mounting bar 40 is arranged with its centre of gravity concentrically to the pivot axis M, it can also be achieved that the closure device 100 cannot be opened by the action of the load independent on size and direction of the acting load. In this case the closure device 100 does not comprise an emergency release function.

The idea on which the invention is based on is not limited to the previously described embodiments, but can basically also be used in completely different embodiments. In particular, a closure device of a described kind cannot only be used for connecting a pole loop to a ski pole grip, but can for instance also be used with other closures, for instance for closing of bags, backpacks or for connecting any other parts.

LIST OF REFERENCE SIGNS

1 connecting module
2 connecting module
4 anchor
5, 5' blocking piece
7 run up slope
8 magnet
9, 9' spring locking element
9*a* hook
10 pole grip
11 actuating handle
12 pole loop
20*a*, 20*b*, 21*a*, 21*a*', 21*b*, 21*b*' guiding section
30*a*, 30*b* shaping
31*a*, 31*b* recess
40 mounting bar
100 closure device
A distance
F0 opening force
Lmax load
M pivot axis
PL load application point
R radius
X closing direction
Y opening direction

The invention claimed is:

1. A closure device for connecting two parts, comprising:
a first connecting module and a second connecting module, wherein the first connecting module can be arranged in a closing direction on the second connecting module and is latched in a closed position with the second connecting module, and
magnetic means which cause a magnetic attraction force between the first connecting module and the second connecting module for supporting the transfer of the first connecting module in the closed position, wherein the first connecting module can be released from the second connecting module by a movement of the first connecting module or a part of the first connecting module in an opening direction which differs from the closing direction, wherein the magnetic means counteract the movement of the first connecting module in the opening direction, wherein the first connecting module and the second connecting module comprise at least one guiding section being formed at least sectionally circular arc shaped for guiding the first connecting module on the second connecting module along the opening direction, wherein the guiding sections are arranged concentrically to a pivot axis defined by the circular arc shaped guiding sections, and wherein a load application point or load application section arranged on the first connecting module, and at which a load is applied to the first connecting module, has a distance from the pivot axis defined by the guiding sections that is smaller than the distance of at least a part of the magnetic means from the pivot axis.

2. The closure device according to claim 1, wherein the distance of the load application point or the load application section from the pivot axis is smaller than the distance of the pivot axis to an impact plane in the area of which the magnetic means are arranged and keep the first connecting module and the second connecting module by magnetic attraction force in the closed position.

3. The closure device according to claim 2, wherein the magnetic means are formed by magnets each arranged on the first connecting module and on the second connecting module or on the one hand by a magnet and on the other hand by magnetic anchor, wherein the impact plane is arranged spatially between these magnetic means.

4. The closure device according to claim 1, wherein the distance of the load application point or load application section from the pivot axis is smaller than the radius of at least one of the guiding sections being formed at least sectionally circular arc shaped in the area of which the magnetic means are arranged.

5. The closure device according to claim 1, wherein the load application point or load application section is concentrically to the pivot axis defined by the guiding sections.

6. The closure device according to claim 1, wherein the first connecting module can be released from the second connecting module by a movement relative to the second connecting module about the pivot axis defined by the guiding sections.

7. The closure device according to claim 1, wherein two or more of the guiding sections being formed at least sectionally circular arc shaped are each provided on the first connecting module and the second connecting module, said guiding sections having different radii to the pivot axis.

8. The closure device according to claim 1, wherein the first connecting module can be actuated via an actuating handle for moving relative to the second connecting module in order to open the closure device, wherein an opening force exerted on the first closing member via the actuating handle, acts as a lever arm about the pivot axis to the first closing member, and provides a larger force than the lever arm of the load applied to the load application point or load application section.

9. The closure device according to claim 1, wherein an emergency release function of the closure device releases the first connecting module from the second connecting module, when a load is applied to the load application point or load application section in the opening direction and exceeds a predetermined load limit.

10. The closure device according to claim 9, wherein a ratio of the predetermined load limit to an opening force required for opening the closure device is determined by a ratio of the lever arm of the opening force to the lever arm of the load applied to the load application point or load application section.

11. The closure device according to claim 1, wherein on the one hand a blocking piece and on the other hand a spring locking element for establishing the form fit mechanical latching are arranged on the first connecting module and on the second connecting module.

12. The closure device according to claim 11, wherein the spring locking element and the blocking piece are moved relative to each other for releasing the first connecting module from the second connecting module such that the spring locking element is moved along the opening direction to release the modules from the at least one blocking piece.

13. The closure device according to claim 11, wherein the spring locking element and the blocking piece are moved towards each other for releasing the first connecting module from the second connecting module such that the spring locking element is displaced by moving on a run up slope crosswise to the opening direction out of engagement with the blocking piece.

14. The closure device according to claim 1, wherein the magnetic means are formed such that by the movement of the first closure member in the opening direction the magnetic attraction force between the first connecting module and the second connecting module is weakened.

15. The closure device according to claim 1, wherein the closure device is formed for connecting a pole grip, in particular a ski pole grip, with a pole loop for holding the pole grip.

* * * * *